United States Patent [19]
Rohs et al.

[11] Patent Number: 4,875,379
[45] Date of Patent: Oct. 24, 1989

[54] APPARATUS FOR MEASURING THE TORQUE OF AN OPERATING SHAFT

[76] Inventors: Ulrich Rohs, Roonstr. 11, D-5160 Dueren; Herbert Meuter, An der Weingass 24, D-5100 Aachen, both of Fed. Rep. of Germany

[21] Appl. No.: 263,064

[22] Filed: Oct. 27, 1988

[30] Foreign Application Priority Data

Oct. 28, 1987 [DE] Fed. Rep. of Germany ....... 3736533

[51] Int. Cl.⁴ .............................................. G01L 3/10
[52] U.S. Cl. ................................................. 73/862.34
[58] Field of Search .......................... 73/862.33, 862.34

[56] References Cited
U.S. PATENT DOCUMENTS
3,871,215  3/1975  Pratt, Jr. et al. .................. 73/862.34

FOREIGN PATENT DOCUMENTS
2118722 11/1972 Fed. Rep. of Germany ... 73/862.33
1281339  7/1972 United Kingdom ............. 73/862.34

Primary Examiner—Charles A. Ruehl
Attorney, Agent, or Firm—Collard, Roe & Galgano

[57] ABSTRACT

An apparatus for measuring the torque of a force-transmitting operating shaft has a pair of measuring disks mounted on the shaft with each disk having a plurality of evenly distributed pulse generators. A sensor is associated with each measuring disk for transmitting energy bursts to the pulse generators. The pulse generators generate voltage pulses applied to receiving devices disposed behind the measuring disks, which pulses are compared in an electronic comparator. Each measuring disk has a plurality of pulse generators on two concentric graduated circles. The number of such pulse generators is different both from one graduated circle to the other graduated circle of the one measuring disk, and from one measuring disk to the other.

9 Claims, 3 Drawing Sheets

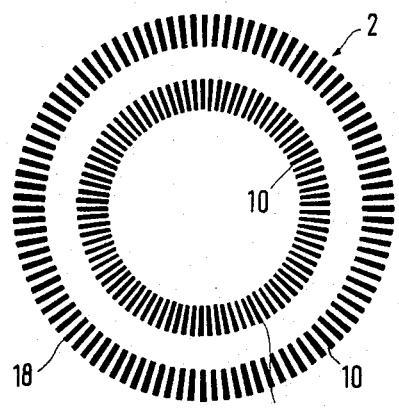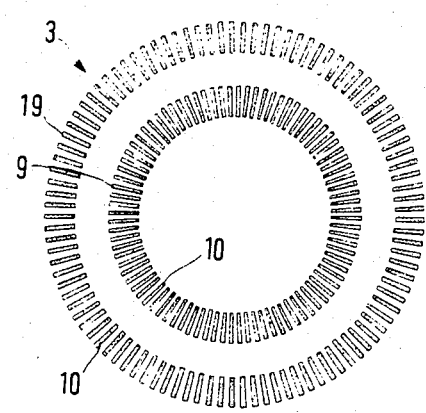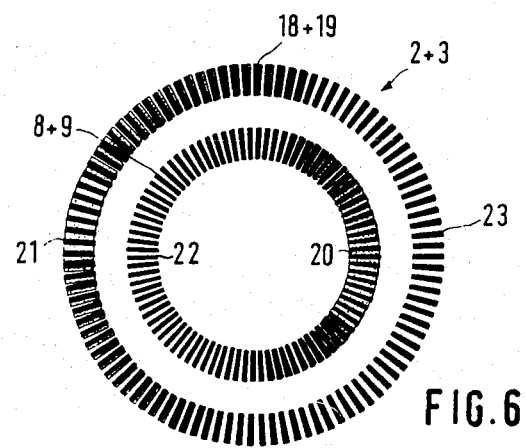

APPARATUS FOR MEASURING THE TORQUE OF AN OPERATING SHAFT

BACKGROUND OF THE INVENTION

1. Field of the Invention

The invention relates to an apparatus for measuring the torque and torque variations of a force-transmitting operating shaft. More specifically, the torque measuring apparatus includes two measuring disks axially spaced along the shaft and revolving with the operating shaft.

2. Description of the Prior Art

Torque measuring disks each supporting a plurality of evenly distributed pulse generators, the number of which may differ from disk to disk are known. It is also known to associate a sensor with each measuring disk. This sensor has an emitter which acts on the pulse generators by emitting bursts of energy impacting a receiving unit which is also part of the sensor. These receiving units are arranged, in each case, behind the measuring disk and generate voltage pulses. The output of the receiver units is connected to an electronic comparator device having a digital and/or analog output.

Such a device is disclosed in German DE-AS 28 11 809 and is suitable for detecting small angles of distortion and thus the torsional strain of a rotating shaft. The prior art device is suitable for directly measuring the torque in connection with force-transmitting operating shafts. However, it has been found that the accuracy of the measurement and the delimitation of the individual measured values are inadequate for determining rotary vibration and output torque. In particular, problems are encountered due to the lack of clarity in the electronic acquisition of such values. This is especially true if such an apparatus is to be used for the determination of the rotary vibration and output in a vehicle drive, for example in order to control the engine as required for certain load conditions.

SUMMARY OF THE INVENTION

It is an object of the invention to provide an apparatus for accurately measuring variations in the output torque of a drive shaft.

It is another object of the invention to provide an apparatus utilizing an electronic comparator to compare signals produced from measuring disks in a shaft to accurately determine the rotary vibration thereof.

It is yet an additional object of the invention to provide an apparatus which can accurately measure torque variations which is simple in design, which measures a variety of variables and is low in cost.

Accordingly, these and related objects are achieved by a device for measuring the torque of a rotating shaft which has first and second measuring disks mounted thereon for rotation therewith. The first and second measuring disks are spaced along the shaft a predetermined distance apart. A multiplicity of pulse generators are evenly distributed around two concentric graduated circular areas on each of the first and second measuring disks. The number of the multiplicity of pulse generators being different on every concentric circular area on the first and second measuring disks. Emitters are associated with a first side of both the first and second measuring disks for emitting energy onto the multiplicity of pulse generators. Receivers are associated with a second side of each of the first and second measuring disks for receiving the energy transmitted by the pulse generators. The receivers in turn generate voltage pulses. An electronic comparator is provided for comparing the voltage pulses produced by the receivers associated with the first and second disks.

If the first and second graduated measuring disks were placed next to each other with little or with no axial distance between the two, a range between relatively high and low permeability (Nonius effect) would result with each pulse generated. This indicates the deviation of the measuring disks from one another. If, for example, a light beam would be emitted through the graduated circles having the pulse generators while the disks are rotated relative to one another, such beam of light would periodically be transmitted in ranges of different brightness. Consequently, a photocell located behind the disks would periodically produce different output voltages which could be measured and compared.

If the measuring disks are turned relative to one another, the result will be a displacement of the spacings between the maximums and minimums of the light intensity received. These changes can be measured to determine the angle of rotation given by the load with a certain torque. The greater the axial distance between two measuring disks, the higher the accuracy of the measurement. The accuracy is increased even more if, according to the invention, each measuring disk is provided with two graduated concentric circles each with a multiplicity of pulse generators instead of only one single graduated circle. Accuracy is further increased if different numbers of pulse generators are associated with the graduated circles of each measuring disk. This almost doubles the above-mentioned "Nonius effect", which results in a significant increase in accuracy.

Because the use of ambient light is not sufficient in practical applications, the invention provides a sensor associated with each graduated circle of each measuring disk. The output of each sensor is evaluated synchronously in an electronic comparator, which then shows the maximum and minimum displacement. The comparator output may, for example, be in the form of more or less long rectangular pulses which, in turn, represent the measured torque.

With the apparatus of the invention it is possible to simultaneously, and with no additional cost, determine the number of revolutions of the driven shaft, as well as its periodic changes, i.e., rotary vibrations. At the same time, it is possible to determine the transmitted output. Furthermore, by means of the sensor devices it is possible to count the measured pulses and to compare such pulses. The differences so determined are also reproducible as a measure for the torque acting on the operating shaft.

These and other objects and advantages of the present invention will become apparent from the following description of the accompanying drawings, which disclose several embodiments of the invention. It is to be understood that the drawings are to be used for purposes of illustration only, and not as a definition of the invention.

BRIEF DESCRIPTION OF THE DRAWINGS

Further advantages and details can be gleaned from the drawings wherein similar reference numerals denote similar elements throughout the several views:

FIG. 4 shows a first measuring disk with two concentric graduated circles of pulse generators;

FIG. 5 shows a second measuring disk having graduated circles with a different number of pulse generators;

FIG. 6 shows the measuring disk of FIG. 4 placed on top of the measuring disk of FIG. 5.

DESCRIPTION OF THE PREFERRED EMBODIMENTS

Figure 1:
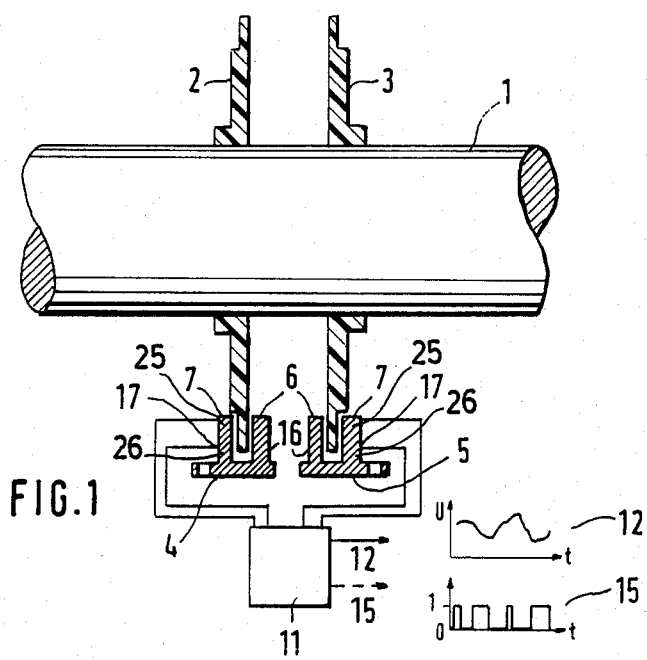
FIG. 1 is a schematic view of an apparatus for determining the torque with two measuring disks with different numbers of pulse generators.
Figure 2:
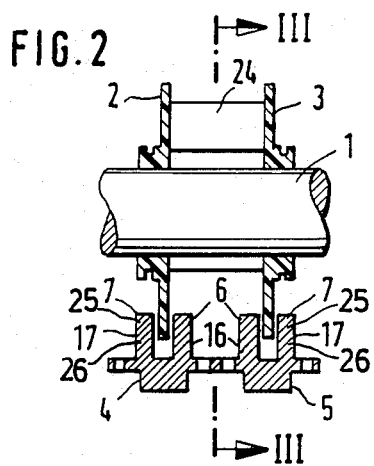
FIG. 2 is a partial schematic view of the apparatus shown in FIG. 1 with the measuring disks connected by a flexible bridge.

Referring to FIGS. 1 and 2, there is shown two measuring disks 2 and 3 mounted on operating shaft 1 with the axial distance "L" therebetween. These disks are rigidly connected with shaft 1 for rotation therewith. Sensors 4 and 5 are associated with first measuring disk 2 and second measuring disk 3, respectively. Each sensor device consists of two emitters 6, 16, both arranged ahead of or in front of measuring disks 2 and 3, respectively, and two receiver units 7, 17, disposed axially behind measuring disk 2 and 3 respectively. Sensors 4, 5 may be in the form of light, inductive or capacitive sensors.

Referring to FIGS. 3–6, each measuring disk 2, 3 has a plurality of pulse generators 10 on two concentric inner and outer graduated circles 8, 18, and 9, 19, respectively. The pulse generators may consist of, for example black radial bars on a transparent measuring disk, or of metallic markings on a plastic disk depending on which type of sensor is used. The number of pulse generators 10 on graduated circles 8, 18; 9, 19 of each measuring disk 2, 3 differs. In addition, the number of pulse generators 10 on the graduated circles 8, 9 and 18, 19 of first and second measuring disks 2, 3, which generators communicate with one another, differs as well. Thus, the number of pulse generators are different on every concentric graduated circle. The number of pulse generators on outer graduated circle 18 of first measuring disk 2 (FIG. 4) may be greater and the number of generators on inner graduated circle 8 may be lower as compared to the corresponding graduated circles 19 and 9 of second measuring disk 3 as shown in FIG. 5. However, it is possible to also have a greater number of pulse generators 10 on graduated circles 8, 18 of measuring disk 2, and a lower number associated with second measuring disk 3.

For example, first measuring disk 2 may have, as shown in FIGS. 4 to 6, an inner graduated circle 8 with 91 pulse generators 10, and an outer graduated circle 18 with 100 pulse generators 10. Second measuring disk 3 may have an inner graduated circle 9 with 88 pulse generators 10 and an outer graduated circle 19 with 102 pulse generators 10. If the measuring disks 2 and 3 are placed one on top of the other as shown in FIG. 6, two different zones 20, 21 with minimum and two different zones 22, 23 with maximum permeability to light or other energy would ensue. Since graduated circles 8, 9 of the first and second measuring disks 2, 3 each have, in one case more and in one case less, pulse generators 10 than associated graduated circles 9, 19 of measuring disk 3, zones 20, 21, and 22, 23 migrate in a counter rotating manner relative to one another as operating shaft 1 rotates. This means that their angular position relative to one another can be recorded and determined with very high accuracy.

The emitters 6 and 16 emit bursts of energy (light, magnetic field, electrical field) in the axial direction through the pulse generators 10 and into compatible receiving units 7 and 17, respectively. Each receiving unit is connected to a well known electronic comparator 11, which has an analog output 12 and/or a digital output 15.

If a common beam of light shining through the pulse generators 10 meets with or finds different cross sections of penetration or passage it influences the receiver in different ways which differences produce detectable changes in the receiver output. The same condition ensues if each measuring disk 2, 3 is associated with its own sensor device 4, 5, for example a stroboscopic light and a photodetector, and if the voltages generated by such sensors are simultaneously supplied to comparator device 11. If the first and second measuring disks are displaced in their positions relative to one another due to a torsional strain of operating shaft 1 caused by the transmitted torque, the impermeable zones 20, 21 are shifted with respect to one another. This spacing ratio, which is also digitally measurable in the form of pulses of different length, is a measure for the acting torque. The receiving units 7, 17 respectively may also have counting devices 25, 26, respectively associated therewith for counting the pulses produced by the pulse generators.

Figure 3:
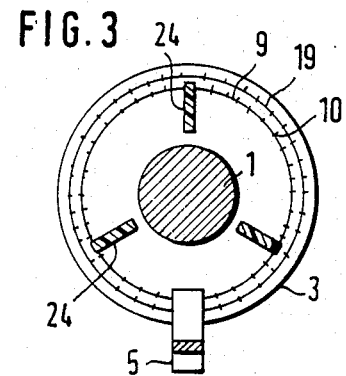
FIG. 3 is a cross-sectional view along line III—III of FIG. 2.
Figure 7:
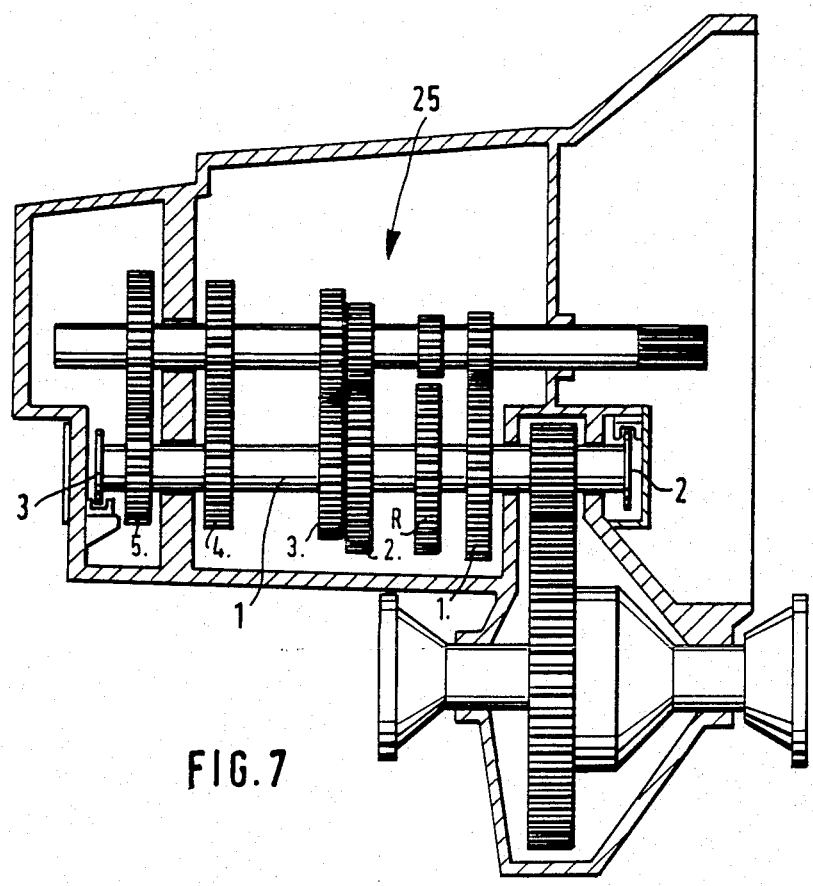
FIG. 7 is a partial side elevation view of the apparatus of the present invention on a vehicle transmission drive shaft thereof.

In order to avoid a time-consuming alignment and adjustment of the measuring disks 2, 3 when the device is installed, it is advantageous if the latter is embodied in the form of a single-piece component. In such a component, the measuring disks may be rigidly connected with one another by the elastic bridges 24 or the like, as shown in FIGS. 2 and 3. These elastic bridges are flexible in that the required relative rotations between the disks is permitted. FIG. 7 shows by way of example the installation of the device of the invention in a vehicle front drive train or transmission.

As the length of distortion of the operating shaft changes in such an embodiment, with each gear step, a large bandwidth ensues within which the torque can be measured. With low torques as with the smallest gear ratio (i.e., if the vehicle were in 5th gear), the length of distortion between the introduction of force and the discharge of force from the operating shaft is great. The length of distortion decreases as the gear ratio becomes greater. The angles of distortion are then of about the same size in all gear ratios in spite of different torques. For the evaluation, the given translation stage or gear ratio is then entered as a factor in the comparator device 11.

While several embodiments and examples of the present invention have been illustrated and described, it is obvious that many changes and modifications may be made thereunto, without departing from the spirit and scope of the invention.

What is claimed is:

1. A device for measuring the torque of a rotating shaft comprising:
 a first measuring disk having two concentric graduated circular areas mounted on the rotating shaft for rotation therewith;
 a second measuring disk having two concentric graduated circular areas, mounted on said shaft for rotation therewith axially spaced from said first measuring disk along the shaft;

a multiplicity of pulse generators evenly distributed around said two concentric graduated circular areas on each of said first and second measuring disks, the number of said multiplicity of pulse generators being different on every concentric circular area on said first and second measuring disks;

emitters associated with a first side of each said first and second measuring disks for emitting energy onto said multiplicity of pulse generators;

receivers associated with a second side of each of said first and second measuring disks for receiving the energy transmitted by said pulse generators, said receivers generating voltage pulses; and an electronic comparator for comparing the voltage pulses produced by said receiver associated with said first and second disks.

2. The device as set forth in claim 1, wherein the number of pulse generators on an inner and outer concentric graduated circular area of said first measuring disk is greater than the number of pulse generators on a corresponding inner and outer concentric graduated circular areas of said second measuring disk.

3. The device as set forth in claim 1, wherein the number of pulse generators on a first graduated circular area of said first measuring disk is greater than the number on an associated first graduated circular area of said second measuring disk and the number of pulse generators on a second graduated circular area on said first measuring disk being smaller than the number on an associated second graduated circular area on said second measuring disk.

4. The device as set forth in claim 1, further including a flexible connecting element extending between facing radially extending surfaces of said first and second disks to maintain said axial spacing but allowing relative rotation between said first and second measuring disks.

5. The device as set forth in claim 1, wherein each said emitter emits light and each said receiver is a photocell.

6. The device as set forth in claim 1, wherein each said emitter emits an electromagnetic field acting on an inductive receiver.

7. The device as set forth in claim 1, wherein each said emitter emits an electrical field acting on a capacitive receiver.

8. The device as set forth in claim 1, wherein said receivers have counting devices.

9. The device as set forth in claim 1, wherein the first measuring disk is placed at one end of the rotating shaft and the second measuring disk is placed at an opposite end of the rotating shaft.

* * * * *